United States Patent [19]

Weber

[11] 4,062,048

[45] Dec. 6, 1977

[54] TAPE TIMING APPARATUS AND METHOD EMPLOYING A PHASE COMPARISON BETWEEN SEQUENTIAL PULSE TRAINS

[75] Inventor: Donald William Weber, Fremont, Calif.

[73] Assignee: Ampex Corporation, Redwood City, Calif.

[21] Appl. No.: 668,659

[22] Filed: Mar. 19, 1976

[51] Int. Cl.² ............................................. G11B 15/00
[52] U.S. Cl. ....................................................... 360/72
[58] Field of Search ........................ 360/72, 70, 73, 52

[56] References Cited

U.S. PATENT DOCUMENTS

| | | | |
|---|---|---|---|
| 3,643,012 | 2/1972 | Clark et al. | 360/70 |
| 3,651,276 | 3/1972 | Clark | 360/70 |
| 3,764,755 | 10/1973 | Yamashita | 360/70 |
| 3,787,615 | 1/1974 | Foerster et al. | 360/70 X |
| 3,852,810 | 12/1974 | McGrath et al. | 360/51 |

Primary Examiner—John H. Wolff
Attorney, Agent, or Firm—George B. Almeida

[57] ABSTRACT

A tape timer system is described for indicating the position of recording tape, moved longitudinally by a drive mechanism, relative to a tape head. Periodic first pulses are developed from the drive mechanism by a tachometer system and are used to operate a counter. The counter produces a series of sequences of count pulses, each count pulse being related to receipt of the first pulses. The phase of the count cycle of the counter is adjusted by comparing the phase of the first pulses with the phase of second pulses related to longitudinal spacing of recorded information on the tape (control track pulses). Information as to tape position is developed from the count pulse sequences which have been phase corrected as needed in accordance with the arrival of the second pulses.

9 Claims, 14 Drawing Figures

TAPE TIMING APPARATUS AND METHOD EMPLOYING A PHASE COMPARISON BETWEEN SEQUENTIAL PULSE TRAINS

This invention relates to tape recording apparatus and, more particularly, to an improved tape timer system for indicating the position of recording tape, moved longitudinally by a drive mechanism, relative to a tape head.

Typical tape recording systems include provision for indicating the longitudinal position of recording tape relative to a tape head, e.g. a magnetic record or reproduce head. These devices, typically known as tape timers, are known as such because the tape position indication is often displayed in a scale of time (hours, minutes, seconds) or, in the case of video recording systems and televison signals, also frames. Prior art tape timer systems have assumed three different basic forms, namely, a tachometer type system, a control track type system, and a combination of the two.

A tachometer type tape timer system develops periodic electrical pulses related to the movement of the drive mechanism which, in turn, is related to tape movement. Typically this is done by employing a tachometer wheel coupled to rotate as the tape is transported. Tachometer sensors produce pulses as the tachometer wheel rotates and these pulses are counted to provide information as to the length of the tape which has been transported past the tape head.

Tachometer type tape timer systems have the advantage that position information is continuously and reliably provided. However, such systems are subject to inaccuracies caused by tape slippage, changes in tape length due to stretching or shrinkage, and other physical variations. Such variations can cause a difference between the actual position of the recorded information on tape relative to the head, and the number of tachometer pulses developed by the tachometer sensors.

Control track tape timer systems avoid the previous mentioned inaccuracies inherent in tachometer type systems. Control track systems operate based upon timing information which is recorded on the recording tape. Usually, such timing information is recorded to provide information for controlling the operation tape recorders. However, such information has been used for tape timing purposes as well. Pulses are developed from information recorded directly on the tape, which are directly related to the longitudinal spacing of the recorded information on the tape. This avoids inaccuracies due to stretch or shrinkage of the tape or slippage thereof.

Also, there are purely mechanical counters, such as found in most inexpensive audio recorders. Such recorders are usually driven by a belt attached to a reel or to a tape idler. They do not provide electrical signals related to tape travel.

Under some circumstances, recorded timing signals on tape may be only intermittent as a result of signal dropouts. In some circumstances, such as is common in video recording applications, there may even be a total absence of recorded timing information on the tape for a substantial portion of the tape length. Under such circumstances, the absence of timing information causes a consequent inability of the tape timer to function.

To counteract the problems inherent in the tachometer type and control track type tape timer systems, tape timer systems have been developed employing a combination of the tachometer and control track systems. A tachometer pulsing system is used to provide consistent timing pulses related to the mechanical drive mechanism and these pulses are employed as the principal source of tape timing information. Control track pulses are also detected, if present, and are employed in a suitable fashion to adjust the tachometer pulses to correctly relate them to the length of the tape transported past the recording head. Such a system avoids timing inaccuracies due to tape slippage and changes in tape length inherent in tachometer type systems while at the same time avoiding disfunction caused by dropout of information inherent in control track timing systems.

Although the combination type systems described in the previous paragraph provide freedom from the problems mentioned, prior art systems of this type have suffered from certain limitations. Among these limitations is that the systems have been unable to accommodate variations in longitudinal tape speeds, but rather have required operation at fixed longitudinal tape speeds. Moreover, such combination systems have frequently suffered from spurious response to tape noise.

It is an object of the present invention to provide a combination tachometer and control track type tape timer system of improved characteristics.

Another object of the invention is to provide a tape timer system of the type described in which variations in the longitudinal speed of the tape are readily and accurately accommodated.

It is another object of the invention to provide a tape timer system of the type described which avoids spurious response due to noise.

Other objects of the invention will become apparent to those skilled in the art from the following description, taken in connection with the accompanying drawings wherein.

Very generally, in the system of the invention, periodic electrical first pulses are developed related to movement of the tape drive mechanism which is related to longitudinal tape movement relative to a tape head. Periodic electrical second pulses are developed related to longitudinal spacing of recorded information on tape. A series of equal numbered sequences of count pulses are produced by an electrical counter in response to receipt of the first pulses thereby. A phase difference between the second pulses and the first pulses is detected and, in the presence of such a phase difference, the counter is reset to begin a new sequence of count pulses. An indication of tape position is produced which is related to the count pulse sequences. Thus, the tape position indication is adjusted as a result of the phase shifting of the sequences of count pulses to coincide with the second pulses.

The invention described herein may be defined in terms of apparatus and method. The method of the invention is best understood through a description of the apparatus of the invention which follows. The invention, as described herein, is particularly related and advantageous in the case of video tape recording and is described, at least in portions, in that context. It will become apparent to those skilled in the art, however, that the invention is applicable to a tape timing system used in connection with the recording of information other than video signals.

Figure 1:
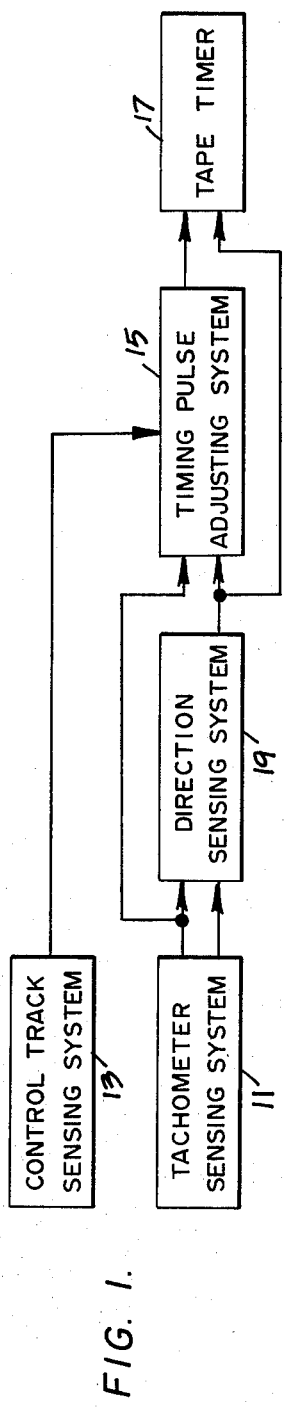
FIG. 1 is a block diagram illustrating a tape timer system constructed in accordance with the invention.

Referring now more particularly to FIG. 1, the system illustrated therein includes a sensing system 11 which is adapted to develop periodic electrical pulses related to movement of the drive mechanism for the recording tape which, in turn, is related to tape movement. The system 11 may comprise a tachometer sensing system of a suitable design known in the art for developing pulses based upon movement of the mechanical elements of the tape transport system.

A second sensing system 13 is employed for developing periodic electrical pulses related to the longitudinal spacing of recorded information on the tape. The system 13 may comprise a suitable control track sensing system of a type and design which is known in the art. Such a system operates to sense the presence of recorded information on the tape to produce periodic timing pulses related thereto.

The pulse output of the sensing system 11 and the pulse output of the sensing system 13 are both applied to a timing pulse adjusting system 15. The timing pulse adjusting system 15, which is described in greater detail below, operates to produce timing pulses and applies same to a tape timer 17. The tape timer 17 may be of conventional design for providing an indication of the position of the recording tape relative to the tape head. The displayed information may, as previously mentioned, comprise time information or, in the case of video recorders, may comprise frame information as well.

The timing system of the invention is capable of operating in either the forward or reverse directions through the employment of a direction sensing system 19. The direction sensing system operates to sense the direction of tape movement by obtaining pulse information related thereto from the tachometer sensing system 11. Information from the direction sensing system 19 is applied to both the timing pulse adjusting system 15 and the tape timer 17 so as to enable the information displayed by the tape timer to reflect both forward and reverse movements of the tape relative to the tape head.

Figure 2:
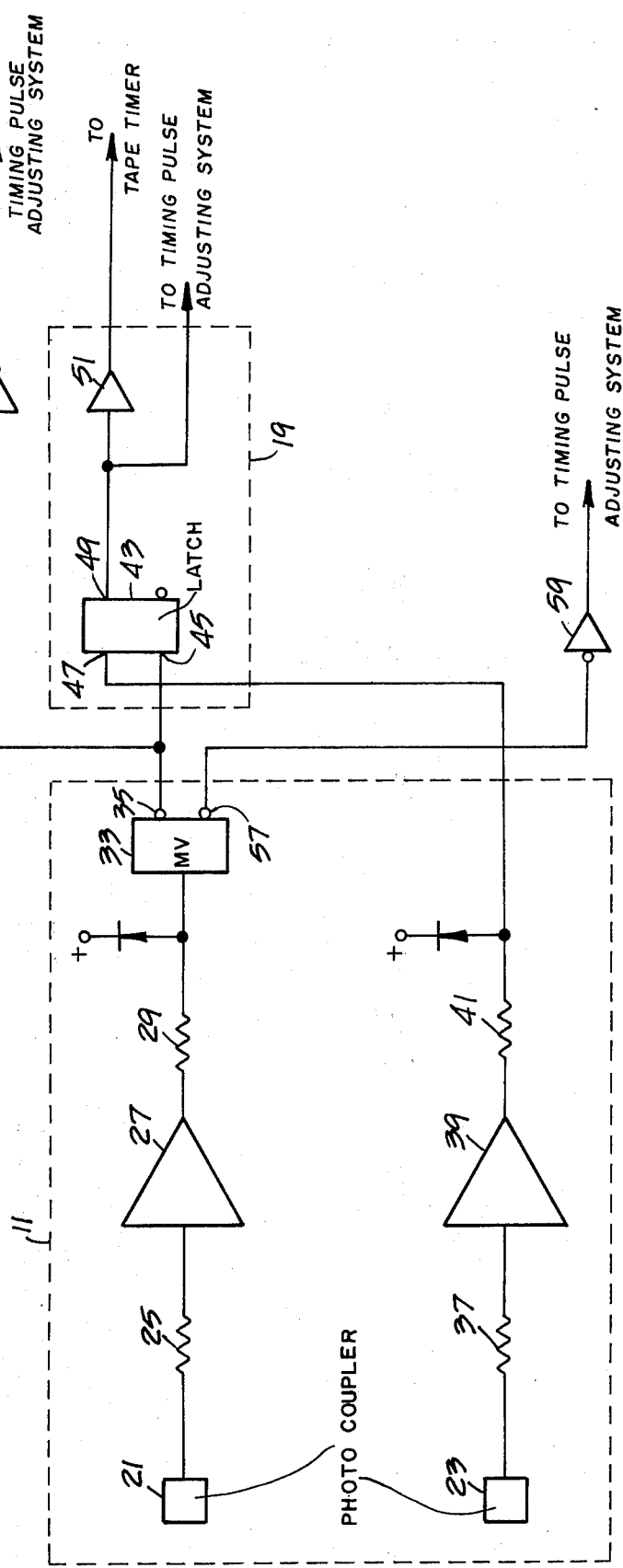
FIG. 2 is a schematic diagram illustrating portions of the system of FIG. 1.

Referring now more particularly to FIG. 2, the tachometer sensing system 11 may be seen in greater detail. The tachometer sensing system 11 may be employed in connection with a tachometer wheel, not illustrated, which rotates in accordance with the unillustrated tape drive mechanism of the recording apparatus being timed. The unillustrated tachometer wheel may be attached to an idler or other rotary device within the tape drive mechanism so that it will rotate in accordance with movement of the tape. The tachometer wheel may have engraved thereon a set of alternate clear and opaque segments. The tachometer sensing system 11 employs a pair of photocouplers 21 and 23 mounted adjacent to the tachometer wheel such that they produce pulses which are 90° out of phase with each other. The photocoupler 21 is connected through a coupling resistor 25 to an amplifier 27. Suitable coupling, bias and stabilization circuitry, not shown, is also provided for the amplifier 27. The pulses provided by the photocoupler 21 are at a rate which is a multiple of the control track rate. In this embodiment, a tachometer pulse rate of 150 pulses per second is selected.

The output of the amplifier 27 is passed through a coupling resistor 29 to one input of a monostable multivibrator 33. When a tachometer signal at the output of the amplifier 27 makes a signal transition from a low level to a high level, the multivibrator 33 provides an output pulse at the output 35 thereof. This is coupled through an inverter 36 to various components of the overall video tape recording system (not shown).

Pulses produced by the photocoupler 23 are coupled through a coupling resistor 37 to an amplifier 39. Suitable biasing, coupling, and stabilization circuitry, not shown, is provided for the amplifier 39. The output of the amplifier 39 is passed through a coupling resistor 41 to the direction sensing system 19.

As previously mentioned, the photocouplers 21 and 23 are positioned with respect to the unillustrated tachometer wheel so that the pulses produced are 90° out of phase. The pulses are of equal duration and amplitude. Thus, in the forward tape direction, the leading or rising edge of each pulse produced by the photocoupler 21 will align with the center of each pulse produced by the photocoupler 23. In the reverse direction, the leading or rising edge of each pulse produced by the photocoupler 21 will fall midway between the pulses produced by the photocoupler 23. This distinction is used, as is known in the art, to provide direction information for the direction sensing system.

The direction sensing system 19 employs a semiconductor latch 43 having inputs 45 and 47. The output of the monostable multivibrator 33 at 35 is coupled to the input 45 of the latch 43. The output of the amplifier 39 is coupled through the resistor 41 to the input 47 of the latch 43. If the tape is travelling in the forward direction, the output of the amplifier 39 is at a high level at the time of the low to high level transition of the output of the amplifier 27. This transition output is coupled to the input 45 of the latch and causes the output 49 of the latch to go to a high level. If the tape is travelling in the reverse direction, the output of the amplifier 39 is at a low level when the output of the amplifier 27 goes from a low level to a high level. Thus, the input 47 of the latch is at a low level while the input 45 makes a transition to a high level, causing the output of the latch at the terminal 49 to move to a low level.

The output from the terminal 49 of the latch 43 is applied to an inverter 51 which is tied to the tape timer 17. In the presence of a high output signal at the terminal 49, a low output signal is applied from the output of the inverter 51 to the tape timer 17. In the presence of a low output at the terminal 49, a high output signal is applied by the inverter to the timer. Thus, in the forward tape direction, the tape timer receives a low and in the reverse direction the tape timer receives a high. These signals are processes by a pulse shaping circuit in the tape timer 17 described below to provide direction information for the timer.

The output from the terminal 49 of the latch 43 is tied to the timing pulse adjusting system 15 as will be explained below. In the event of a high output at the terminal 49, the output fed to the timing pulse adjusting system 15 will be high, and in the event of a low output at the terminal 49, the introduced output is low. The input to the timing pulse adjusting system will then be at a high level when the tape is moving forward and at a low level when the tape is moving in a reverse direction.

Figure 3:
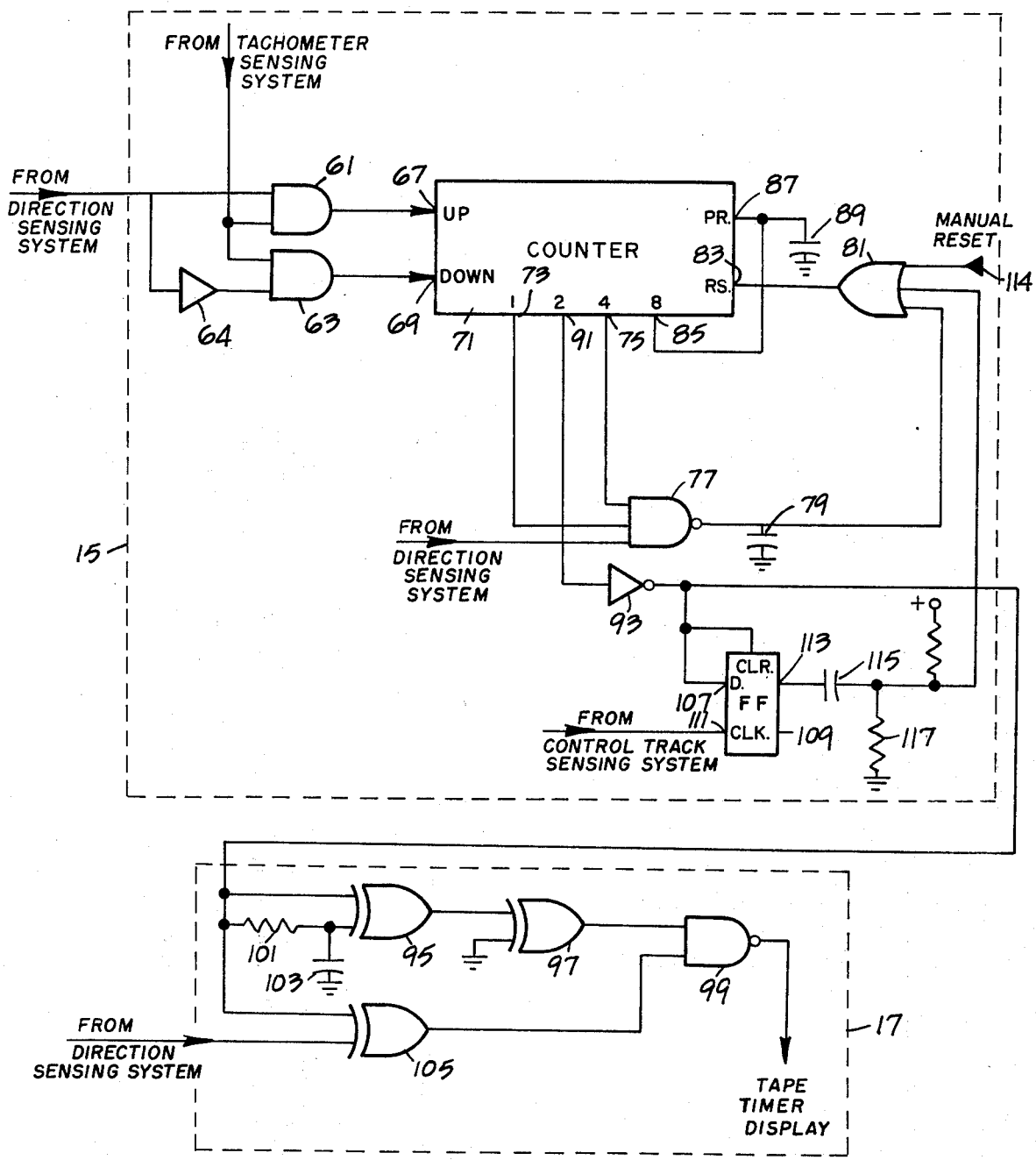
FIG. 3 is a schematic diagram illustrating further portions of the system of FIG. 1.

A second output 57 of the multivibrator 33 is applied through a signal inverter 59 to the timing pulse adjusting system 15. As may be seen in FIG. 3, this output is applied to a first input of each of a pair of AND gates 61 and 63. In addition, the output of the terminal 49 is tied to a second input of the AND gate 63 through an inverter 64, and is tied directly to a second input of the AND gate 61. The outputs of the AND gates 61 and 63 are tied to inputs 67 and 69, respectively, of an electrical counter 71. The electrical counter 71 may be of any suitable type, such as, for example, a bidirectional binary counter, Texas Instruments model 74SL 193. Such a counter has a 16 count capacity with four binary positions when connected as illustrated in FIG. 3. Terminals 73 and 75 (the one binary and four binary positions) of the counter are connected to two inputs of a three input AND gate 77. The third input of the AND gate 77 receives a high level-related signal from the direction sensing system in the forward direction and a low level-related signal in the reverse direction. The output of the AND gate 77 is coupled along a line, reference to ground through a capacitor 79, to one input of a three input OR gate 81. The output of the OR gate is connected to the reset terminal 83 of the counter. The eight binary terminal 85 and the preset terminal 87 of the counter are connected to each other by a line grounded through a capacitor 89. The counter will count to a binary state of five in either direction.

Four consecutive pulses applied to the terminal 67 will cause the counter 71 to count from zero to four. The next (fifth) pulse momentarily places the counter in a count state of five. In this state, there is an output at the terminals 73 and 75 of the counter 71, causing an output from the AND gate 77. This output is applied to the reset terminal 83 of the counter through the OR gate 81, resetting the counter to zero. Thus, in the illustrated embodiment, the counter resets after producing a sequence of five consecutive binary states. Assuming a 150 pulse per second input, the counter divides this input by five, providing cycling through a series of five pulse sequences at 30 sequences per second, an output which is at the frame rate of U.S. television video signals. Of course, if increments other than frame rate are desired to be counted, for example seconds, a suitable counter may be arranged to count 150 pulses before each reset, making each sequence 150 binary states long.

In the reverse direction of the tape, the counter is commanded to count down as a result of pulse inputs to the terminal 69. In counting down, the counter eventually will go to zero and the next pulse received by the counter at the terminal 69 will place the counter in a fully loaded condition. This would be equivalent to a full count state of 16 for the model of counter described above as an example. The eight binary position of the counter, namely, the terminal 85, is connected to the terminal 87 to present the counter to a count state of four at the time the counter is fully loaded. The counting then continues in reverse. In this fashion, four consecutive pulses at the terminal 69 cause the counter to count down from four to zero. The fifth pulse momentarily places the counter in a count state of 16, which presets the counter to four for continued down counting. As was the case in the forward direction, this also divides the received pulses by five by cycling with a sequence of five binary states. The self reset pulses of the counter are shown in wave form A of FIG. 4 and occur at the same position in either forward or reverse.

In the illustrated embodiment, a pulse output is applied to the tape timer 17 derived from the counter 71. This pulse, in the illustrated embodiment, is generated each time the counter changes count from three to four in the forward direction and from four to three in the reverse direction. To this end, the output of the inverter 93 is applied to a bidirectional differentiator circuit which forms part of the tape timer 17 and which is illustrated in FIG. 3. The bidirectional differentiator includes a pair of exclusive OR gates 95 and 97 which are series coupled to each other and provide an output to a NAND gate 99. The input of the exclusive OR gate 95 includes an RC circuit comprised of a resistor 101 and a capacitor 103.

The terminal 91 of the counter goes to a low level during the transition from the three count period to the four count period and remains at that low level until the next count two period. Referring to FIG. 5, this wave form is illustrated as the wave form A. It is an inverted form (because of being coupled through inverter 93) of wave form B in FIG. 4, expained below. Thus, its relationship to the counter self reset may be seen by reference to the topmost wave form A in FIG. 4.

Figure 4:
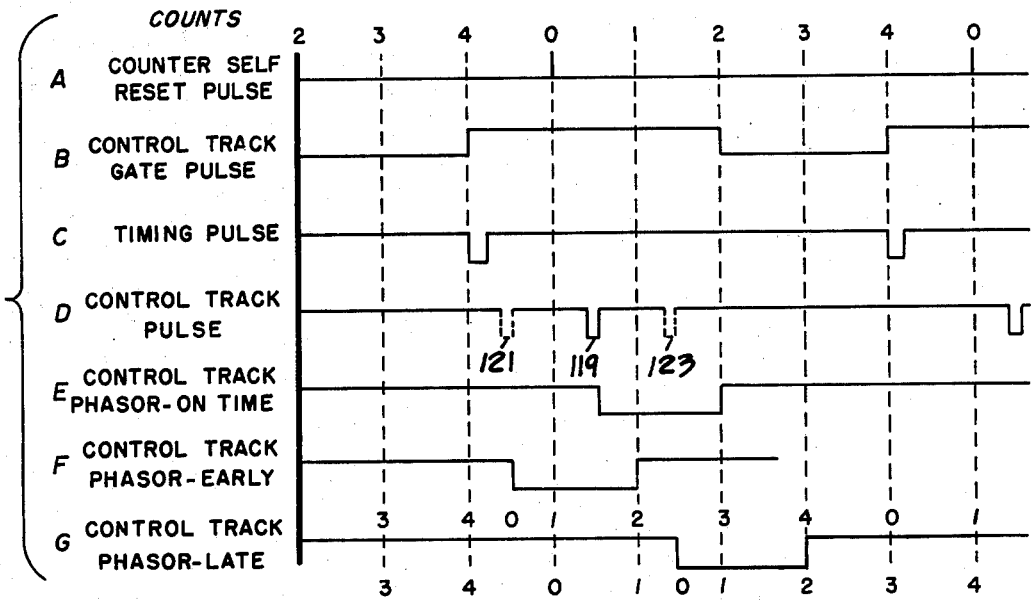
FIG. 4 is a plot of various wave forms present in the system of FIGS. 1 through 3.
Figure 5:
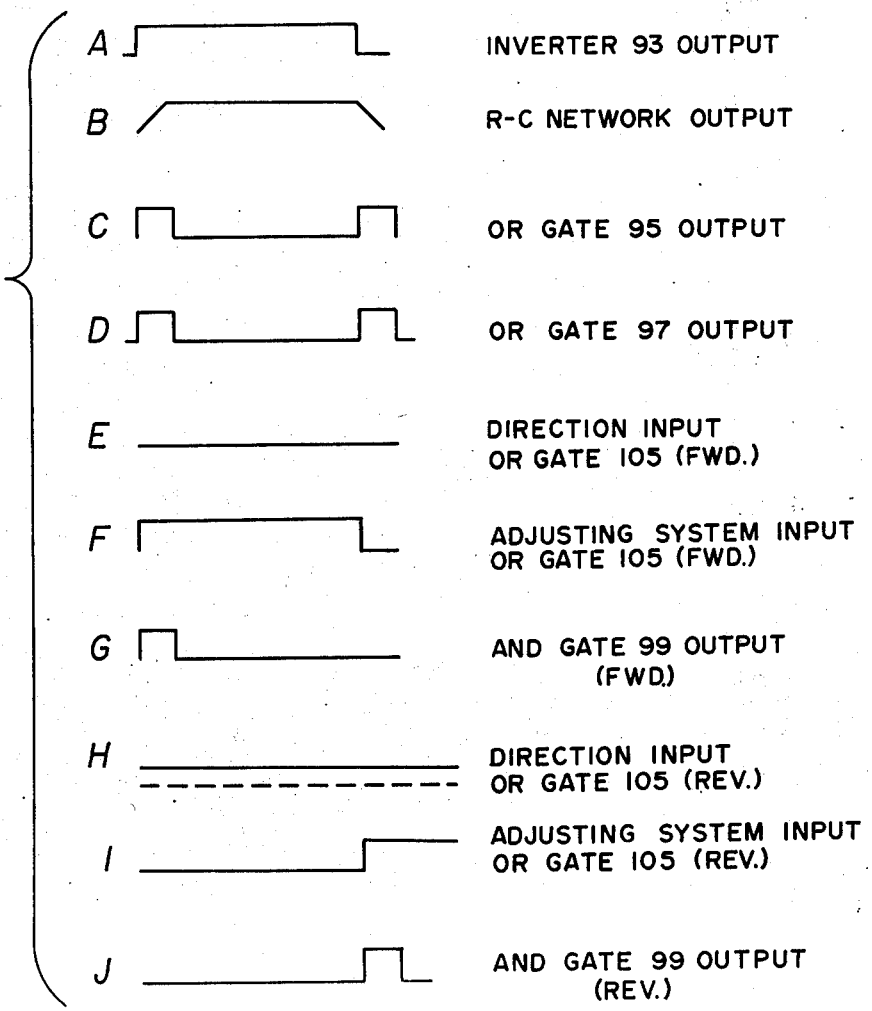
FIG. 5, consisting of A through J, is a plot of further wave forms present in the portion of the system illustrated in FIG. 3.

The wave form A, in FIG. 5 and the wave form B in FIG. 4 (the control track gate pulse), are generated from the two binary position or terminal 91 of the counter 71 by the inverter 93 (FIG. 3). The terminal 91 will be active or in a high logic level only during the two and three count intervals of the five count cycle. This is true regardless of the direction of tape movement and hence the direction in which the counter 71 is counting. The two binary position stage or terminal 91 is in the opposite state during the four, zero, and one count intervals of the count cycle of the counter 71. This opposite state condition is used to generate the control track gate pulse wave form by the use of the inverter 93.

Returning now to FIG. 5, wave form A (appearing at the inverter 93 output) is applied to the uppermost input of the exclusive OR gate 95. Because of the RC network at the lowermost input of the exclusive OR gate 95, the wave form thereat appears as shown at B in FIG. 5. Accordingly, upon the occurrence of the leading edge of the control track gate pulse A, the OR gate 95 provides an output (shown by wave form C) to the exclusive OR gate 97. This in turn provides a pulse output (shown by wave form D) which is applied to the input of the NAND gate 99.

The NAND gate 99 is enabled, of course, only when an input pulse is also applied to its lower input terminal and this is controlled by the direction sensing system. In the forward direction of the tape, the rising edge of the pulse at wave form A causes a pulse input to the NAND gate 99 and the AND gate is enabled at this time, thereby providing a pulse output (wave form G) which is used to trigger the time of frame counter and indicator or timer display, not shown, in the timer 17. In the reverse mode, an enabling pulse is applied to the NAND gate 99 only at the time of the falling edge of the wave form A of FIG. 5. A positive pulse is generated on the falling edge by the exclusive OR gates as a result of the delay in the fall off of the voltage at the lower input to the OR gate 95 caused by the RC network 101-103. Thus, the NAND gate 99 output appears as in wave form J.

To provide enabling of the NAND gate 99 at the proper times, the output from the direction sensing latch 43 is connected to an input of the exclusive OR gate 105 via the inverter 51. Upon the occurrence of the forward condition of the tape, the voltage at the lowermost input of the exclusive OR gate 105 is low (wave form E), resulting in an output by the OR gate 105 to the NAND gate 99 upon the occurrence of a rise in voltage at the other terminal of the OR gate 105 produced by the wave form A in FIG. 5. On the other hand, when the tape is moving in the reverse direction, the lowermost input of the OR gate 105 is at a high level (wave form H above low level as dashed line). Accordingly, upon the occurrence of the falling edge of the wave form illustrated as A in FIG. 5, the exclusive OR gate 105 will provide an output to enable the NAND gate 99 to produce a pulse at the appropriate time.

In accordance with the invention, the pulses produces by the tape timer 17 in response to count sequences produced by the counter 71 are adjusted in phase to coincide with the arrival of control track pulses. Referring to FIG. 3, the output of the inverter 93 is coupled to an input 107 of a D type flipflop 109. The other input 111 of the D type flipflop 109 is connected to receive pulses from the suitably constructed control track sensing system 13 (FIG. 1). The output terminal 113 of the flipflop 109 is coupled through a capacitor 115 and grounded resistor 117 to the input of the OR gate 81. The flipflop 109 is enabled only during the interval from the transition between the three and four counts to the transition between the two and three counts, namely, during the interval at which the control track gate pulse (wave form B, FIG. 4) is at the high level. Thus, only during that interval will the input 107 of the flipflop 109 be at the high level, thus enabling the flipflop 109 to be triggered by a pulse received at the input 111. When enabled, the flipflop 109 produces a pulse via the capacitor 115/resistor 117 upon receipt of the pulse at the input 111 from the control track or other timing information on the tape. The pulse thus produces at 113 is applied to the OR gate 81 and from thence to the terminal 83 of the counter 71, resetting the counter to the zero count. The OR gate 81 also includes a manual reset input 114.

Referring now to FIG. 4, it may be seen that the control track gate pulse is centered at the zero interval or binary state of the counter. The counts are indicated above the wave form A. The control track gate pulse has a duration of three counts. During the interval at which the control track gate pulse is at the low level at the input 107 of flipflop 109 noise or other spurious signals from the tape will not trigger reset of the counter 71. Such noise signals received during the interval at which the control track gate enables the flipflop 109 will serve to reset the counter sufficiently close to the time that it should and that deviation is readily corrected with subsequent cycles.

Referring now to FIGS. 3 and 4, the control track pulse which arrives at the input 111 of the flipflop 109 is illustrated as wave form D. As shown in the solid lines, the control track pulse 119 is on time. Assuming the tape is moving in the forward direction, the counter is already in zero state as a result of the prior occurrence of the self-reset pulse. Therefore, it is not effected by the output of the flipflop 109. The same occurs in the reverse mode. Because the flipflop 109 remains in this state until the control track gate pulse B is terminated, it will not respond to further control track pulses or noise until the next control track gate pulse occurs.

The pulse 121 at wave form D illustrates a condition where the control track pulse arrives early, that is during the interval between the fourth and fifth counts of the count sequence. The output of the flipflop 109 is shown in wave form F and results in resetting of the counter 71 to zero coincident with receipt of the control track pulse. The counter then continues to respond to the next pulse received at the input 67 from the tachometer pulse sensing system. This has the effect of advancing the count sequence in time or the effect of phase shifting the count sequence in accordance with changes in the relative timing between the tachometer pulses and the control track pulse. Thus, the count sequence of the counter is adjusted to the occurrence of the control track pulse. Because the count cycle of the counter is advanced, the control track gate pulse is terminated earlier as well.

The pulse 123 in the wave form D of FIG. 4 indicates a condition when the control track pulse is received late, that is, during the interval between the counts one and two of the counter 71. Upon such an occurrence, the flipflop 109 produces an output as shown in wave form G of FIG. 4. This resets the counter a second time, that is, after it has only counted to one. The effect is to extend the duration of the control track gate pulse until the beginning of the two count interval of the counter. Once again, a shifting in time or a phase shifting of the count sequence of the counter 71 occurs adjusted to the occurrence of a control track pulse.

It may be seen from the description above, that the flip-flop 109 can respond only to control track pulses arriving when the control track gate pulse is at a high level, thereby establishing a preselected deviation beyond which the control track pulses are excluded from beginning a new count pulse sequence.

It will be appreciated that speed variations are readily accommodated by the invention. The shifting of phase is dependent upon the shifting of the count cycle or sequence of the counter. Since the counter sequence is reset at any time the control track pulse is not on time, which can occur at any speed of the tape transport, the phase of the count sequence is adjusted. Since the time of issuance of the timing pulse output depends upon a fixed position in the count sequence, the time of issuance of this pulse is suitably adjusted for any tape speed. Because of the width of the reset window provided by the three count width of the control track gate pulse (wave form B in FIG. 4), relatively wide speed variations are easily accommodated with appropriate resetting of the counter.

It may be seen, therefore, that the invention provides an improved tape timer which is capable of providing continuous timing information updated in accordance with control track pulse information. Response to spurious signals, such as noise, is minimized, and the device is capable of operating at a variety of speeds and in either direction of tape movement.

Various modifications of the invention in addition to those shown and described herein will become apparent to those skilled in the art from the foregoing description and accompanying drawings. Such modifications are intended to fall within the scope of the appended claims.

What is claimed is:

1. Apparatus for indicating the position of recording tape, moved longitudinally by a drive mechanism, relative to a tape head, comprising, means for developing periodic electrical first pulses related to movement of the drive mechanism which is related to tape movement, means for developing periodic electrical second pulses related to longitudinal spacing of recorded information on the tape, means for producing a series of equal numbered sequences of count pulses related to said first pulses, means for beginning a new one of said sequences of said count pulses only upon the occurrence of a detected phase difference between said second pulses and said first pulses, and means for producing an indication of tape position related to the count pulse sequences, whereby the new sequences of count pulses are phase shifted to coincide with the second pulses.

2. Apparatus according to claim 1 wherein said first pulse developing means comprise a tachometer pulse system.

3. Apparatus according to claim 1 wherein said second pulse developing means comprise means for sensing control track pulses on the recording tape.

4. Apparatus according to claim 1 wherein said count pulse sequence developing means comprise an electrical counter adapted to reset after producing each sequence of count pulses, and wherein said adjusting means comprise means for resetting said counter means upon detection of a phase difference between said second pulses and said first pulses.

5. Apparatus according to claim 1 wherein said pulse adjusting means include means for preventing reset of said electrical counter means during a preselected portion of each count sequence.

6. A tape timer system for indicating the position of recording tape, moved by a drive mechanism, relative to a tape head, comprising, means for developing electrical first pulses related to a movement of the drive mechanism which is related to tape movement, means for developing periodic electrical second pulses related to the spacing of recorded information on the tape, electrical counter means adapted to produce periodic count pulses related to receipt of the first pulses, said counter means being adapted to reset after producing each of a series of equal numbered sequences of count pulses, means coupled to said counter means for indicating tape position related to the count pulse sequences produced by said counter means, and phase adjusting means adapted to receive the second pulses and being responsive to a phase difference between the second pulses and the first pulses to reset said counter means to the beginning of a count pulse sequence, whereby production of the sequences of count pulses by said counter means is phase shifted in accordance with the occurrence of second pulses.

7. A method for indicating the position of recording tape, moved longitudinally by a drive mechanism, relative to a tape head, comprising, developing periodic electrical first pulses related to movement of the drive mechanism which is related to tape movement, developing periodic electrical second pulses related to longitudinal spacing of recorded information on the tape, producing a series of equal numbered sequences of count pulses related to said first pulses, detecting a phase difference between said second pulses and said first pulses and, only in response to such a phase difference, beginning a new one of said sequences of said count pulses, and producing an indication of tape position related to said count pulse sequences, whereby said new sequences of said count pulses are phase shifted to coinicide with said second pulses.

8. A method according to claim 7 wherein the indication of tape position is related to a portion of each sequence of count pulses which is displaced from the beginning thereof by an amount not less than the maximum amount of phase shift.

9. A method according to claim 7 wherein phase differences outside of preselected deviation are excluded from beginning a new count pulse sequence.

* * * * *

UNITED STATES PATENT OFFICE
CERTIFICATE OF CORRECTION

PATENT NO. : 4,062,048
DATED : December 6, 1977
INVENTOR(S) : Donald W. Weber

It is certified that error appears in the above-identified patent and that said Letters Patent are hereby corrected as shown below:

IN THE DRAWINGS:

Figure 2, change the output of inverter 36 from "TO TIMING PULSE ADJUSTING SYSTEM" to --TO SYSTEM--;
 insert a small circle on the output of the triangle numbered 51 to indicate an inverter (51);
 delete the small circle on the output 35 of the multivibrator 33.

Figures 5F and 5I, change the captions to read --OR GATE 105 OUTPUT (FWD)--, and --OR GATE 105 OUTPUT (REV)-- respectively.

Figures 5G and 5J, change the positive-going pulses to show negative-going pulses.

Figures 5G and 5J, change the captions from "AND" to --NAND--.

IN THE SPECIFICATION:

Column 6, line 54, change "AND" to --NAND--.

Signed and Sealed this

Twenty-seventh Day of June 1978

[SEAL]

Attest:

RUTH C. MASON
Attesting Officer

DONALD W. BANNER
Commissioner of Patents and Trademarks